United States Patent
Vajravel et al.

(10) Patent No.: US 12,248,593 B2
(45) Date of Patent: Mar. 11, 2025

(54) TAKING SNAPSHOTS WITH INTEGRITY OF SECURE WORKSPACES HAVING DISTRIBUTED CACHE

(71) Applicant: Dell Products L.P., Round Rock, TX (US)

(72) Inventors: Gokul Thiruchengode Vajravel, Bangalore (IN); Vivekanandh Narayanasamy Rajagopalan, Bangalore (IN); Srinivasa Ragavan Rajagopalan, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 291 days.

(21) Appl. No.: 18/055,091

(22) Filed: Nov. 14, 2022

(65) Prior Publication Data
US 2024/0160761 A1 May 16, 2024

(51) Int. Cl.
*G06F 21/62* (2013.01)
*G06F 21/64* (2013.01)

(52) U.S. Cl.
CPC .......... *G06F 21/6218* (2013.01); *G06F 21/64* (2013.01)

(58) Field of Classification Search
CPC ....... G06F 21/6218; G06F 21/64; G06F 21/53
See application file for complete search history.

(56) References Cited

U.S. PATENT DOCUMENTS

| | | | | |
|---|---|---|---|---|
| 6,182,198 B1 * | 1/2001 | Hubis | ................ | G06F 11/1466 711/112 |
| 7,669,020 B1 * | 2/2010 | Shah | ................... | G06F 11/1458 717/148 |
| 8,024,442 B1 * | 9/2011 | Roussos | .............. | H04L 67/1097 711/202 |
| 9,092,376 B1 * | 7/2015 | Chelur | ................ | G06F 11/1451 |
| 9,823,973 B1 * | 11/2017 | Natanzon | ................ | G06F 3/067 |
| 9,898,371 B2 * | 2/2018 | Kumarasamy | ........ | G06F 16/134 |
| 10,359,969 B1 * | 7/2019 | Ovchinnikov | ........ | G06F 3/0664 |
| 10,613,947 B2 * | 4/2020 | Chandrasekaran | ......................... | G06F 9/45558 |
| 11,307,882 B1 * | 4/2022 | Zidenberg | ........... | G06F 9/45508 |
| 11,663,092 B2 * | 5/2023 | Meadowcroft | ..... | G06F 11/2035 707/649 |
| 12,013,783 B2 * | 6/2024 | Awan | ................... | G06F 12/0804 |

(Continued)

FOREIGN PATENT DOCUMENTS

| CN | 104484354 A | * | 4/2015 | .......... G06F 11/1446 |
|---|---|---|---|---|
| CN | 106919471 A | * | 7/2017 | .......... G06F 11/1448 |

(Continued)

*Primary Examiner* — Shahriar Zarrineh
(74) *Attorney, Agent, or Firm* — Kirton McConkie; Brian Tucker

(57) ABSTRACT

Snapshots with integrity can be taken of secure workspaces having distributed cache. When a snapshot of a secure workspace is to be taken, a host agent executing external to the secure workspace can instruct a workspace agent running inside the secure workspace to lock a filesystem and flush the cache within the secure workspace. The host agent can then lock the filesystem and flush the cache outside the secure workspace. The host agent may then create a snapshot of the secure workspace. After the snapshot is created, the host agent can unlock the filesystem outside the secure workspace and instruct the workspace agent to unlock the filesystem inside the secure workspace.

20 Claims, 8 Drawing Sheets

(56) References Cited

U.S. PATENT DOCUMENTS

| | | | | |
|---|---|---|---|---|
| 2003/0101200 A1* | 5/2003 | Koyama | G06F 16/182 |
| 2008/0140897 A1* | 6/2008 | Ganguly | G06F 12/1027 | 711/135 |
| 2008/0155169 A1* | 6/2008 | Hiltgen | G06F 9/5077 | 711/6 |
| 2010/0011178 A1* | 1/2010 | Feathergill | G06F 11/1466 | 711/E12.103 |
| 2012/0324183 A1* | 12/2012 | Chiruvolu | G06F 11/2097 | 711/E12.103 |
| 2013/0054529 A1* | 2/2013 | Wang | G06F 11/1448 | 707/639 |
| 2014/0012940 A1* | 1/2014 | Joshi | G06F 9/45558 | 709/214 |
| 2014/0013059 A1* | 1/2014 | Joshi | G06F 9/5077 | 711/144 |
| 2014/0059298 A1* | 2/2014 | Olin | G06F 12/08 | 711/143 |
| 2014/0059300 A1* | 2/2014 | Olin | G06F 3/0619 | 711/E12.017 |
| 2014/0258235 A1* | 9/2014 | Jin | G06F 11/1438 | 707/639 |
| 2015/0081979 A1* | 3/2015 | Banta | G06F 12/0804 | 711/143 |
| 2015/0089673 A1* | 3/2015 | Beckman | H04L 63/02 | 726/29 |
| 2015/0242283 A1* | 8/2015 | Simoncelli | G06F 11/1456 | 711/162 |
| 2016/0011809 A1* | 1/2016 | Matsuzawa | G06F 3/0655 | 711/113 |
| 2016/0103739 A1* | 4/2016 | Huang | G06F 11/1451 | 714/19 |
| 2016/0179419 A1* | 6/2016 | Yamaguchi | G06F 3/0619 | 711/162 |
| 2016/0203013 A1* | 7/2016 | Bayapuneni | G06F 9/45545 | 718/1 |
| 2017/0031830 A1* | 2/2017 | Bk | G06F 3/0604 |
| 2017/0147227 A1* | 5/2017 | Stabrawa | G06F 3/065 |
| 2018/0253362 A1* | 9/2018 | Reinecke | G06F 11/1471 |
| 2018/0300205 A1* | 10/2018 | Sehgal | G06F 11/1451 |
| 2019/0026187 A1* | 1/2019 | Gulam | G06F 16/128 |
| 2019/0138400 A1* | 5/2019 | Csatari | G06F 11/1438 |
| 2019/0220444 A1* | 7/2019 | Guo | G06F 9/45558 |
| 2019/0339889 A1* | 11/2019 | Lu | G06F 3/0647 |
| 2020/0034250 A1* | 1/2020 | Chandrasekaran | G06F 9/45558 |
| 2020/0065399 A1* | 2/2020 | Desai | G06F 9/45558 |
| 2021/0034245 A1* | 2/2021 | Tylik | G06F 3/0683 |
| 2021/0294651 A1* | 9/2021 | Misca | G06F 9/5061 |
| 2022/0004623 A1* | 1/2022 | Trabelsi | H04L 63/029 |
| 2022/0114080 A1* | 4/2022 | Jackson | G06F 11/1469 |
| 2022/0342721 A1* | 10/2022 | Shveidel | G06F 9/546 |

FOREIGN PATENT DOCUMENTS

| | | | | |
|---|---|---|---|---|
| CN | 114281600 A | * | 4/2022 | |
| KR | 20150063244 A | * | 6/2015 | |
| KR | 20180074136 A | * | 7/2018 | |
| KR | 20230100304 A | * | 7/2023 | |
| WO | WO-2014036135 A1 | * | 3/2014 | G06F 8/61 |
| WO | WO-2017190758 A1 | * | 11/2017 | G06F 11/1438 |

* cited by examiner

TAKING SNAPSHOTS WITH INTEGRITY OF SECURE WORKSPACES HAVING DISTRIBUTED CACHE

CROSS-REFERENCE TO RELATED APPLICATIONS

N/A

BACKGROUND

In the context of this application, a secure workspace refers to an isolated environment in which one or more applications may be hosted on a computing device. A secure workspace, which may also be referred to as a sandbox, is oftentimes implemented using a virtual machine, a software-based container, a virtual desktop infrastructure, or a cloud container. An application hosted in a secure workspace will be isolated from resources in the external environment and from other applications or services hosted external to the secure workspace, including native applications and applications hosted in other secure workspaces.

When applications are hosted in secure workspaces, taking a snapshot of the applications or of the secure workspace itself requires shutting down the secure workspace to ensure that the applications' data is flushed from the various caches in which it may be stored. However, shutting down a secure workspace is disruptive and requires trusting the host operating system.

BRIEF SUMMARY

The present invention extends to systems, methods and computer program products for taking snapshots with integrity of secure workspaces having distributed cache. When a snapshot of a secure workspace is to be taken, a host agent executing external to the secure workspace can instruct a workspace agent running inside the secure workspace to lock a filesystem and flush the cache within the secure workspace. The host agent can then lock the filesystem and flush the cache outside the secure workspace. The host agent may then create a snapshot of the secure workspace. After the snapshot is created, the host agent can unlock the filesystem outside the secure workspace and instruct the workspace agent to unlock the filesystem inside the secure workspace.

In some embodiments, the present invention is implemented as a method for taking a snapshot with integrity of a secure workspace having a distributed cache. A host agent executing on a user computing device can receive a request to take a snapshot of a secure workspace that is deployed on the user computing device. The host agent can notify a workspace agent that is executing inside the secure workspace that the snapshot is to be taken. The workspace agent can cause a cache inside the secure workspace to be flushed. The host agent can cause a cache outside the secure workspace to be flushed. The host agent can create a snapshot of the secure workspace after the cache inside the secure workspace and the cache outside the secure workspace have been flushed.

In some embodiments, the present invention may be implemented as computer storage media storing computer executable instructions which when executed implement a method for taking a snapshot with integrity of a secure workspace having a distributed cache. A host agent executing outside a secure workspace can notify a workspace agent that is executing inside the secure workspace that a snapshot is to be taken. The workspace agent can cause a filesystem inside the secure workspace to be locked and a cache inside the secure workspace to be flushed. The host agent can cause a filesystem outside the secure workspace to be locked and a cache outside the secure workspace to be flushed. The host agent can take a snapshot of the secure workspace after the cache inside the secure workspace and the cache outside the secure workspace have been flushed.

In some embodiments, the present invention may be implemented as a user computing device that includes one or more processors and computer storage media storing computer executable instructions which when executed implement a method for taking a snapshot with integrity of a secure workspace having a distributed cache. A request to take a snapshot of a secure workspace can be received. A filesystem within the secure workspace can be locked. A cache within the secure workspace can be flushed. A filesystem outside the secure workspace can be locked. A cache outside the secure workspace can be flushed. A snapshot of the secure workspace can be taken after the cache within the secure workspace and the cache outside the secure workspace are flushed.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
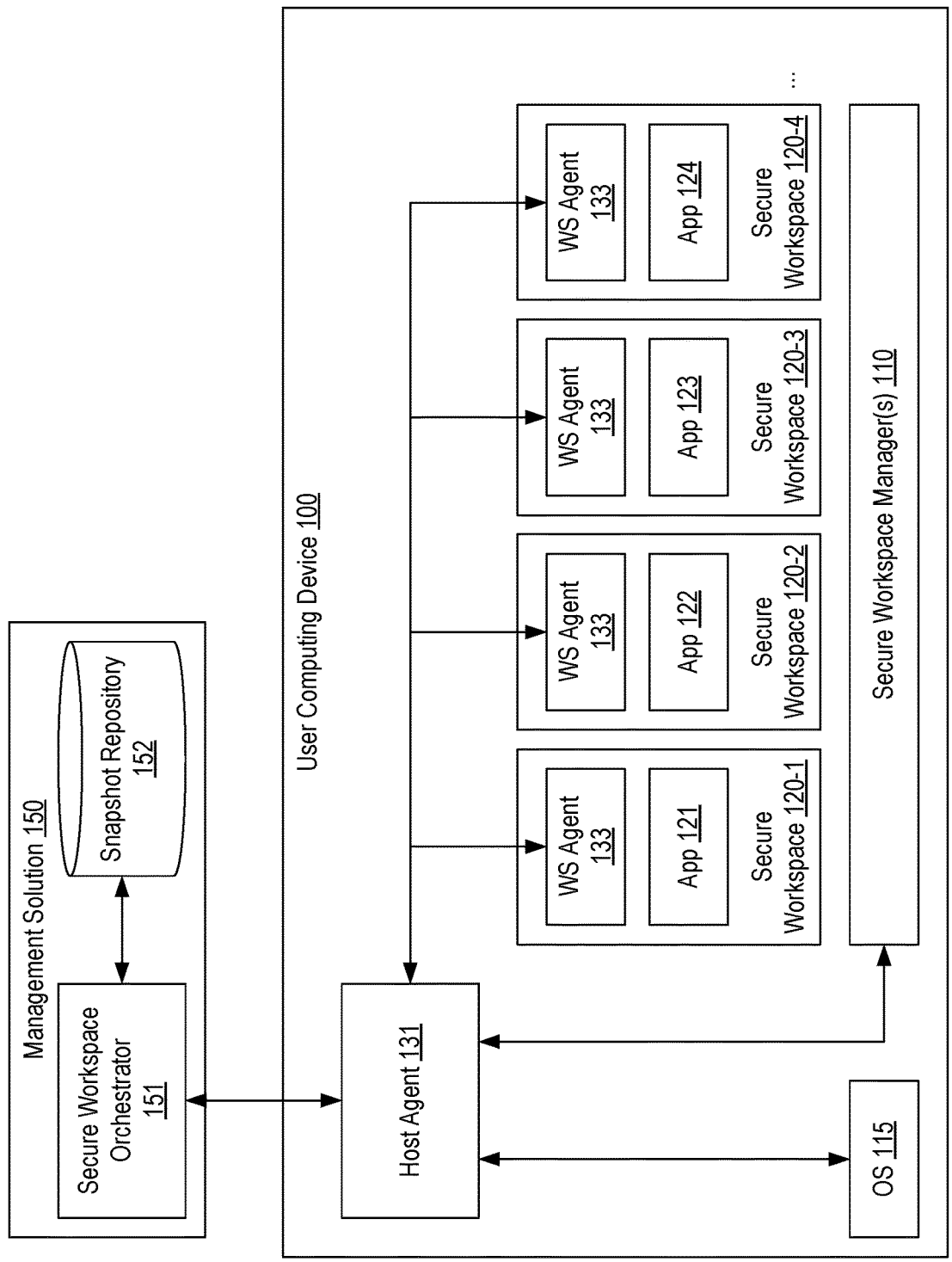
FIG. 1 provides an example of a computing environment in which embodiments of the present invention may be implemented.

FIG. 1 provides an example of a computing environment in which one or more embodiments of the present invention may be implemented. This computing environment includes a user computing device 100 and a management solution 150 which is used to manage user computing device 100. Although only a single user computing device 100 is shown, management solution 150 would typically be used to manage a large number of user computing devices, any or all of which could be configured in the same manner as user computing device 100 to thereby enable snapshots with integrity to be taken of secure workspaces having distribute cache in accordance with embodiments of the present invention.

User computing device 100 is shown as having one or more secure workspace managers 110. A secure workspace manager is intended to represent the components on user computing device 100 that allow secure workspaces to be deployed. For example, a secure workspace manager may be a hypervisor (e.g., Hyper-V) when virtual machines are used to implement secure workspaces, a container daemon when containers (e.g., Docker containers) are used to implement secure workspaces, a sandbox manager when sandboxes (e.g., Sandboxie isolated environments) are used to implement secure workspaces, a Webapp manager when a browser sandbox is used to implement secure workspaces, etc. In the depicted example, it is assumed that four secure workspaces 120-1 through 120-4 are deployed on user computing device 100. However, there could be any number and/or type of secure workspaces at any given time. These secure workspaces are represented as hosting applications 121, 122, 123, and 124 respectively. Notably, a secure workspace could include more than one application.

User computing device 100 also includes an operating system (OS) 115 which can be considered the base operating system to distinguish it from an operating system inside any of the secure workspaces (e.g., inside a virtual machine). Some or all the secure workspaces could run in the context of operating system 115 (e.g., when the secure workspace is a software container) and/or some or all the secure workspaces could run in separate virtual machines. User computing device also includes host agent 131 which can run in the context of operating system 115.

Host agent 131 can be configured to implement management services on user computing device 100 including the deployment and management of secure workspaces on user computing device 100. For example, a secure workspace orchestrator 151 on management solution 150 may interface with host agent 131 to provide secure workspaces (or at least information for creating secure workspaces), and host agent 131 may interface with secure workspace manager(s) 110 to create and manage the secure workspaces.

Each secure workspace can include a workspace agent 133 that is configured to interface with host agent 131 to facilitate the taking of snapshots with integrity of the secure workspaces deployed on user computing device 100 in accordance with embodiments of the present invention. These snapshots could be stored on user computing device 100 and/or in a snapshot repository 152 on or accessible to management solution 150.

Figure 2A:
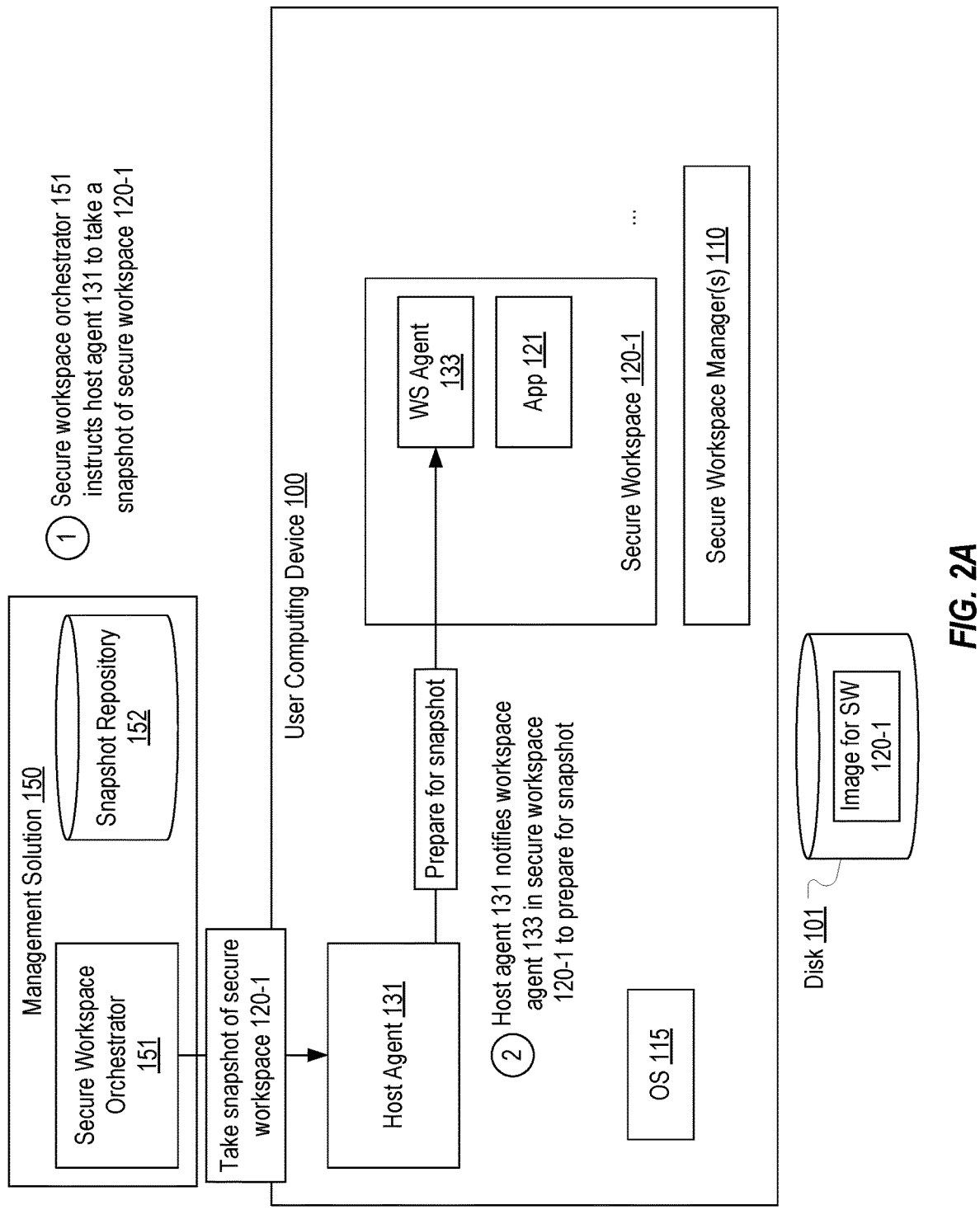
FIGS. 2A-2F provide an example of how a snapshot with integrity can be taken of a secure workspace having a distributed cache.

FIGS. 2A-2F provide an example of how snapshots with integrity can be taken of secure workspaces having distributed cache in accordance with one or more embodiments of the present invention. As represented in FIG. 2A, it is assumed in this example that secure workspace 120-1 has been deployed on user computing device 100 from an image maintained in disk 101. As one example only, this image for secure workspace 120-1 could be a VHDX file. It is also assumed that host agent 131 and workspace agent 133 in secure workspace 120-1 have established a session for communicating with one another.

In step 1, it is also assumed that secure workspace orchestrator 151 instructs host agent 131 to take a snapshot of secure workspace 120-1 (or of application 121 which is running in secure workspace 120-1). This instruction to take the snapshot could be in response to administrator input, in accordance with a schedule, etc. and could include an identifier of secure workspace 120-1. In step 2, host agent 131 can notify workspace agent 133 running in secure workspace 120-1 to prepare for a snapshot. For example, based on the identifier of secure workspace 120-1 contained in the instruction received from secure workspace orchestrator 151, host agent 131 may identify and employ the session corresponding to secure workspace 120-1 to send the notification.

Figure 2B:
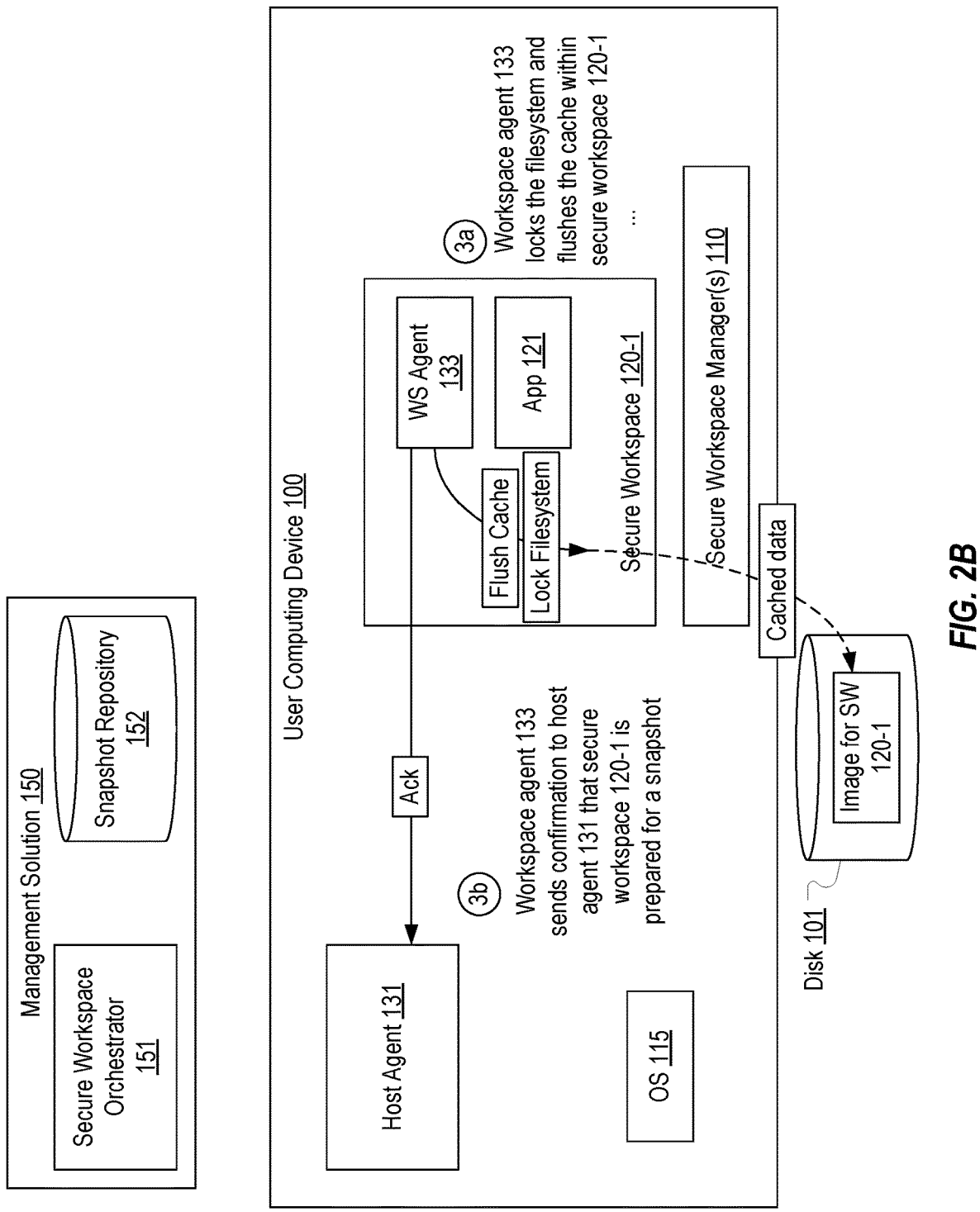

Turning to FIG. 2B, in step 3a and in response to the notification, workspace agent 133 can lock the filesystem and flush the cache within secure workspace 120-1. For example, if secure workspace 120-1 is Windows-based, workspace agent 133 could send an IOCTL_VOLSNAP_FLUSH_AND_HOLD_WRITES control code as part of an IRP_MJ_DEVICE_CONTROL request targeting the volume device object of a file system within secure workspace 120-1. As another example, if secure workspace 120-1 is Linux-based, workspace agent 133 could invoke the fsfreeze and/or freeze_super commands. As a result of step 3a, any of application 121's cached data and any data cached by the filesystem within secure workspace 120-1 will be flushed from secure workspace 120-1 (e.g., to the image for secure workspace 120-1). In step 3b, and after locking the filesystem and flushing the cache, workspace agent 131 can send confirmation to host agent 131 that secure workspace 120-1 is prepared for a snapshot.

Figure 2C:
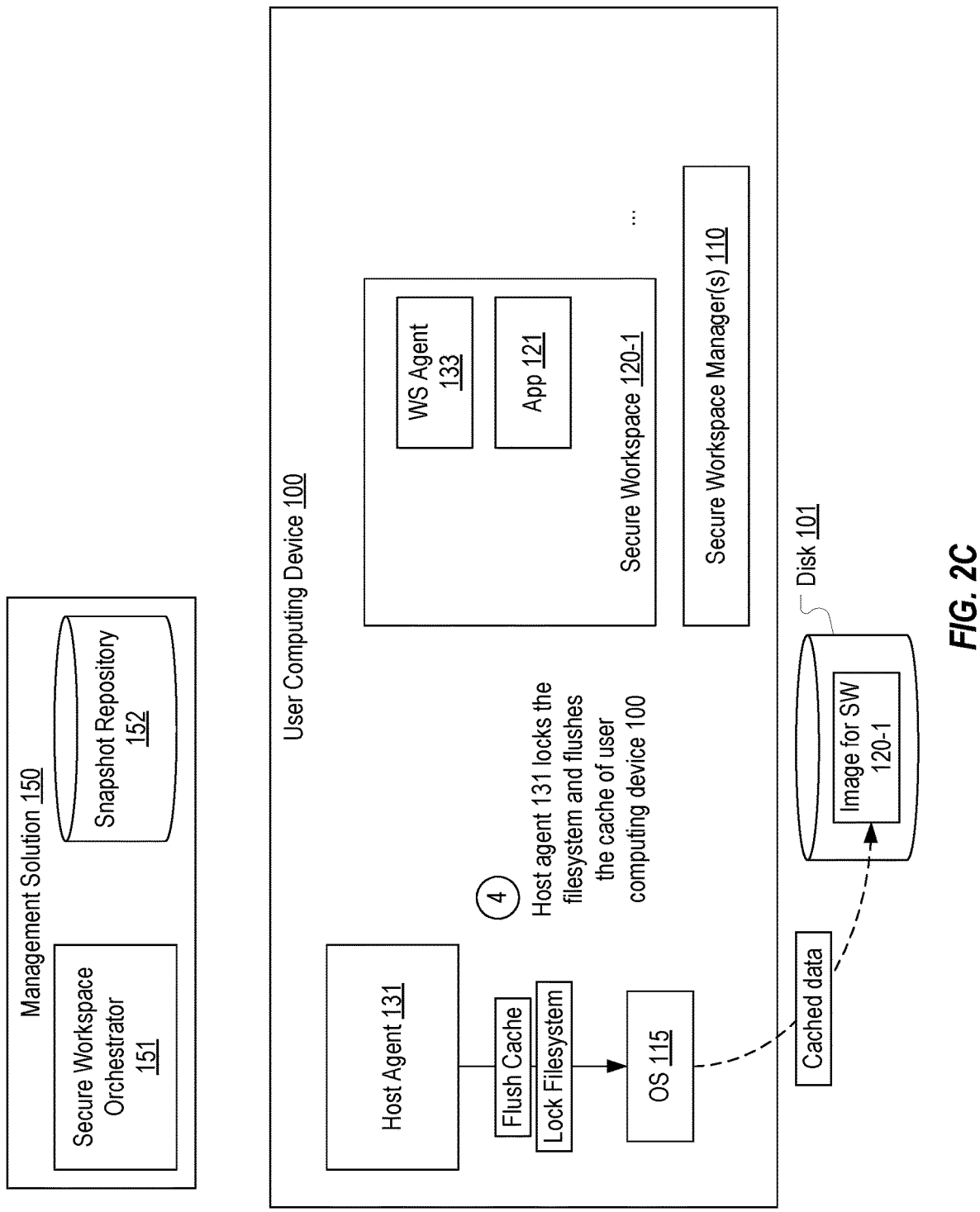

Turning to FIG. 2C, in step 4 and after workspace agent 133 has confirmed that the filesystem within secure workspace 120-1 has been locked and the cache has been flushed, host agent 131 can lock the filesystem and flush the cache of user computing device 100 (e.g., by interfacing with operating system 115 using the control code or commands referenced above). As a result of step 4, any cached data pertaining to but outside of secure workspace 120-1 can be flushed to the image for secure workspace 120-1. Accordingly, after step 4, all data relating to the execution of application 121 can be flushed. This data could include application 121's cache within secure workspace 120-1, the filesystem cache inside secure workspace 120-1 (e.g., a Hyper-V storage cache), the filesystem cache of operating system 115 (e.g., the filesystem in which the image for secure workspace 120-1 is stored), and a hardware cache for disk 101 (e.g., a disk controller cache).

Figure 2D:
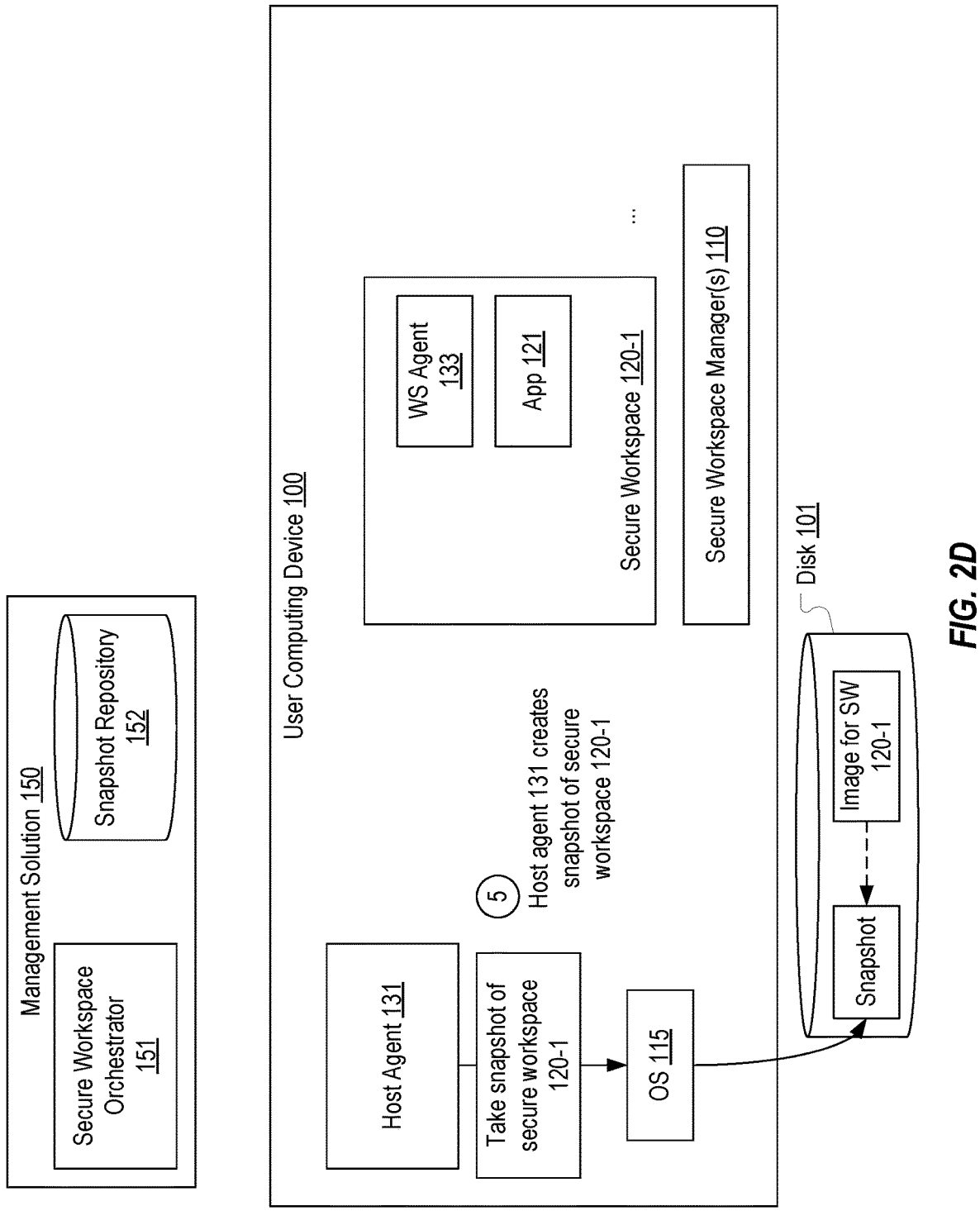

Turning to FIG. 2D, in step 5, host agent 131 can create a snapshot of secure workspace 120-1. For example, host agent 131 could interface with operating system 115 to create a snapshot from the image of secure workspace 120-1. As examples only, in embodiments where operating system 115 is a version of Windows, host agent 131 could use the Msvm_SnapshotOfVirtualSystem class to accomplish this step, whereas in embodiments where operating system 115 is a version of Linux, host agent 131 could use the Libvirt APIs to accomplish this step.

Figure 2E:
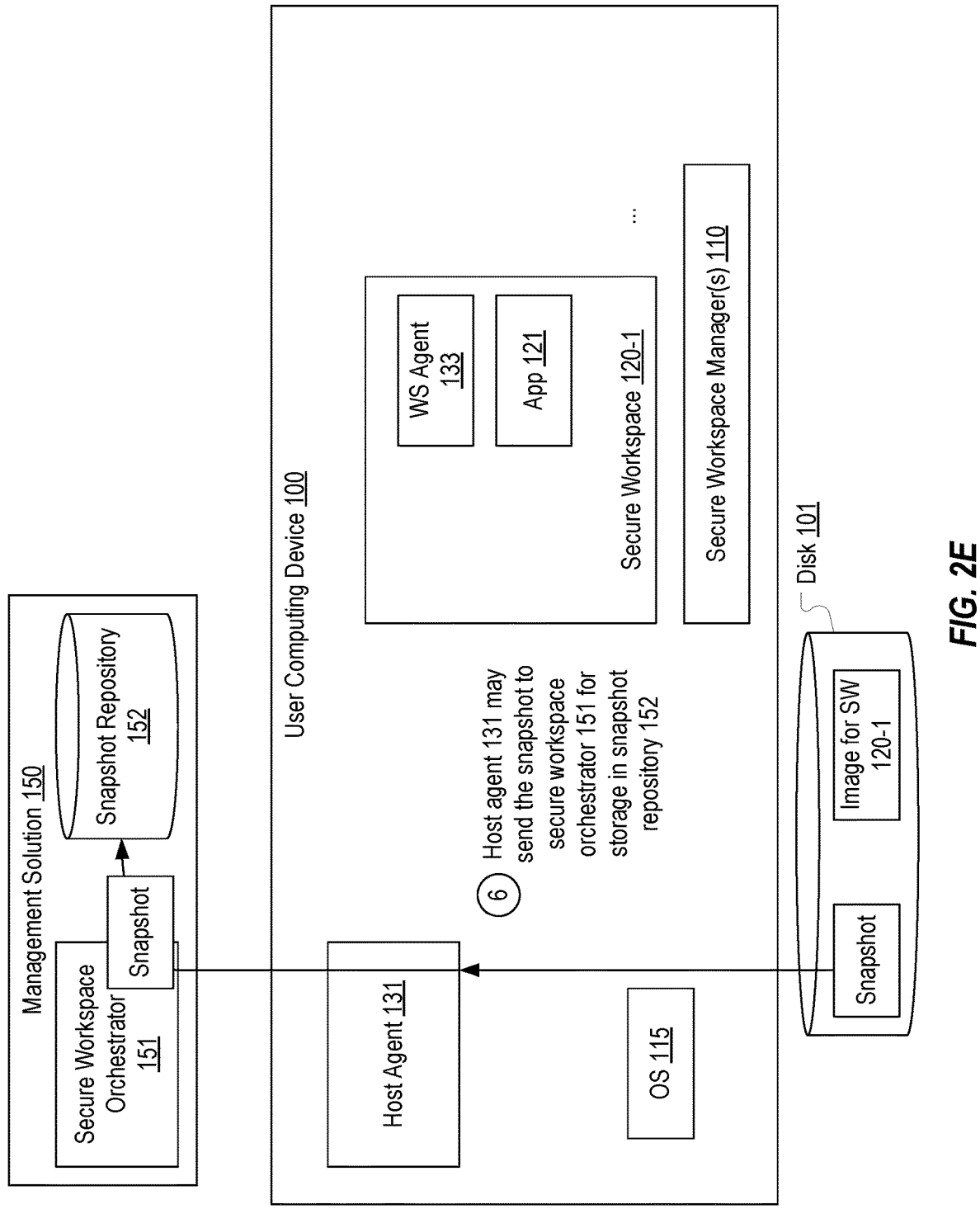

Turning to FIG. 2E, in step 6, host agent 131 may send the snapshot to secure workspace orchestrator 151 for storage in snapshot repository 152. In some embodiments, however, host agent 131 may only retain the snapshot in a local repository or some other storage location.

Figure 2F:
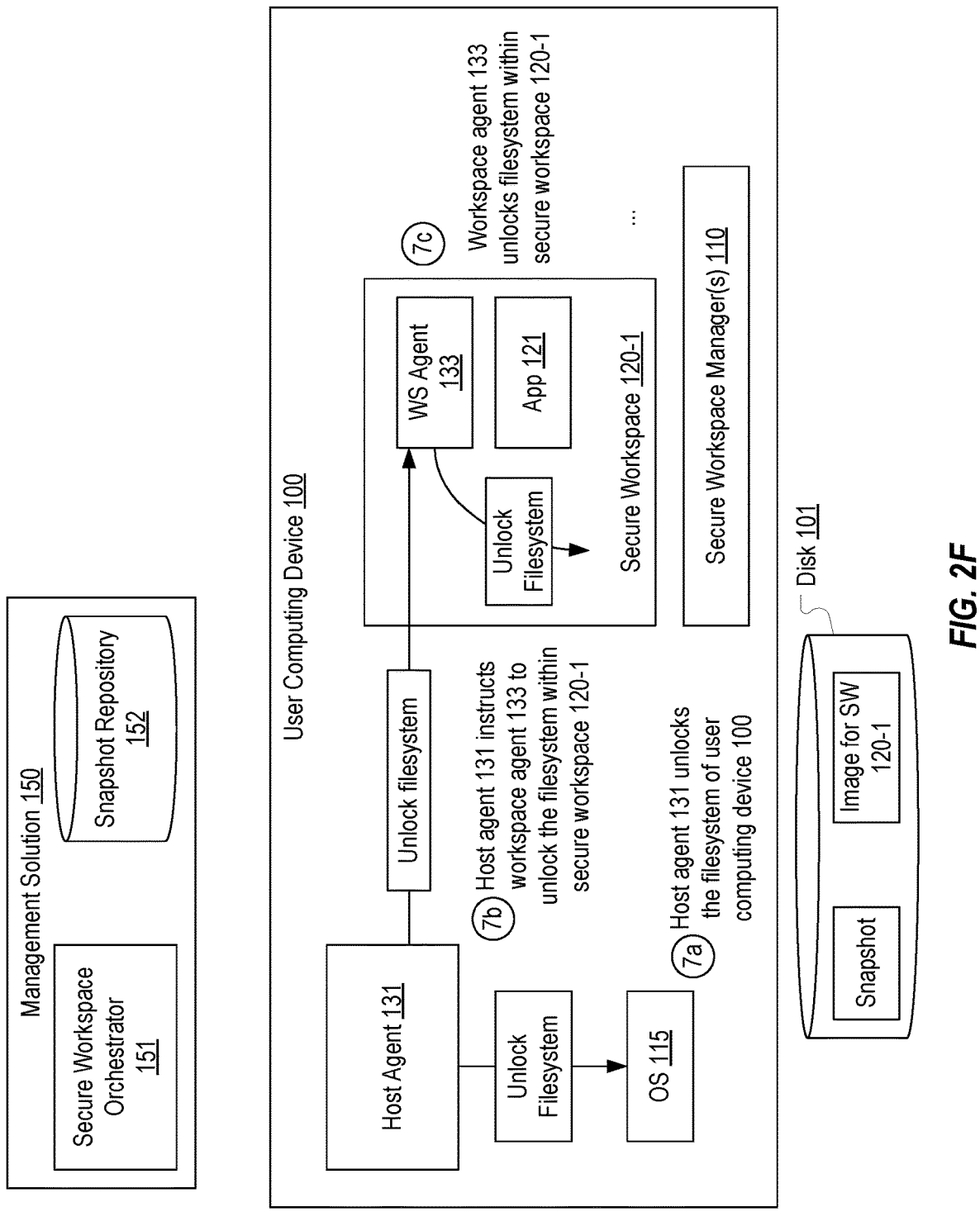

Turning to FIG. 2F, in step 7a, host agent 131 unlocks the filesystem of user computing device 100 (e.g., using the control code or commands referenced in step 3a above). This will allow writes to the filesystem provided by operating system 115 to be resumed. In step 7b, host agent 131 can instruct workspace agent 133 in secure workspace 120-1 to unlock the file system in secure workspace 120-1, and then in step 7c, workspace agent 133 does so (e.g., using the control code or commands referenced in step 3a above). This will allow writes to the filesystem within secure workspace 120-1, including application 121's writes, to resume). At this point, secure workspace 120-1 can resume its normal operation. Given that the above-described steps can be taken relatively quickly, the user's experience may only be minimally impacted during the short period when the filesystem within secure workspace 120-1 is locked.

In embodiments where a secure workspace may be a virtual machine running a separate operating system from operating system 115, the above-described process for creating a snapshot with integrity can be performed even when operating system 115 and the operating system within the secure workspace are not the same. For example, operating system 115 could be a version of Windows and the operating system inside secure workspace 120-1 could be a version of Linux. In such a case, host agent 131 can still instruct workspace agent 133 to lock the filesystem and flush the cache within secure workspace 120-1 as described above thereby allowing the snapshot of the Linux-based secure workspace to be obtained from the Windows environment external to secure workspace 120-1.

Similarly, in embodiments where a secure workspace is implemented using a cloud container, the above-described process can be performed by leveraging available APIs within the cloud environment. For example, in an Azure cloud environment, host agent 131 could leverage the snapshots API to create a snapshot of the secure workspace as part of step 5.

Figure 3:
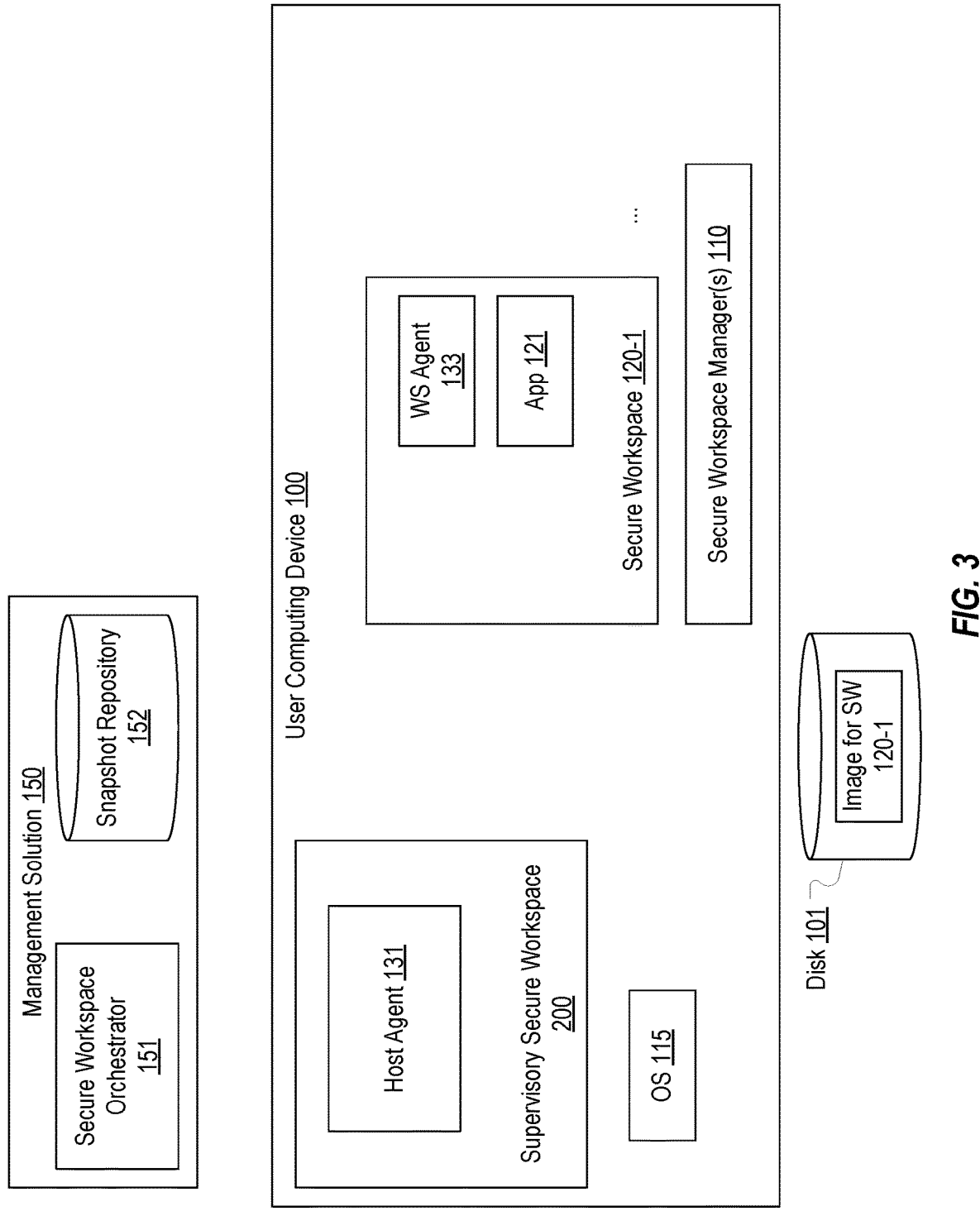
FIG. 3 provides another example of a computing environment in which embodiments of the present invention may be implemented.

In some embodiments, operating system 115 may not be trusted. In such cases, a supervisory secure workspace 200 (e.g., in the form of a virtual machine) may be deployed on user computing device 100 and may include host agent 131 as represented in FIG. 3. This host agent 131 that is embedded in supervisory secure workspace 200 can then perform the above-described functionality using virtual machine introspection libraries (e.g., to interface with workspace agent 133 to cause the filesystem to be locked and the cache flushed and to interface with operating system 115 to cause the filesystem to be locked and the cache flushed and then to create the snapshot) resulting in the snapshot being created from within supervisory secure workspace 200. This snapshot can then be provided to secure workspace orchestrator 151 for storage in snapshot repository 152.

In the above-described examples, only a single secure workspace has been considered. However, the same functionality could be performed to take snapshots of any number of secure workspaces that may be concurrently deployed on user computing device 100. Notably, these concurrently deployed secure workspaces could be the same type or different types of secure workspaces. Regardless of the type of secure workspace, host agent 131 and workspace agent 133 can perform the above-described functionality to ensure that a snapshot of the secure workspace will include all the data of any applications executing in the secure workspace and will therefore have integrity.

In summary, embodiments of the present invention enable a snapshot of a secure workspace to be created with integrity with minimal if any impact on user productivity. These benefits can be provided for each secure workspace deployed on a user computing device and regardless of the type of the secure workspace.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:
1. A method for taking a snapshot with integrity of a secure workspace having a distributed cache, the method comprising:
   receiving, at a host agent executing on a user computing device, a request to take a snapshot of a secure workspace that is deployed on the user computing device, the host agent executing outside the secure workspace;
   notifying, by the host agent, a workspace agent that is executing inside the secure workspace that the snapshot is to be taken;
   causing, by the workspace agent, a cache inside the secure workspace to be flushed;
   sending, by the workspace agent, a notification to the host agent, the notification indicating that the cache inside the secure workspace has been flushed;
   in response to the cache inside the workspace being flushed, causing, by the host agent, a cache of the user computing device outside the secure workspace to be flushed; and
   creating, by the host agent, a snapshot of the secure workspace after the cache inside the secure workspace and the cache of the user computing device outside the secure workspace have been flushed.

2. The method of claim 1, wherein causing the cache inside the secure workspace to be flushed includes locking a filesystem inside the secure workspace.

3. The method of claim 1, wherein causing the cache of the user computing device outside the secure workspace to be flushed includes locking a filesystem of the user computing device outside the secure workspace.

4. The method of claim 1, wherein the host agent causes the cache of the user computing device outside the secure workspace to be flushed after being notified that the workspace agent caused the cache inside the secure workspace to be flushed.

5. The method of claim 1, wherein the secure workspace is a virtual machine.

6. The method of claim 1, wherein the secure workspace is a software container.

7. The method of claim 1, wherein the secure workspace is a cloud container.

8. The method of claim 1, wherein the secure workspace is a virtual desktop infrastructure container.

9. The method of claim 1, further comprising:
sending the snapshot to a management solution for storage in a snapshot repository.

10. The method of claim 1, wherein the host agent executes in a supervisory secure workspace on the user computing device.

11. The method of claim 1, wherein a host operating system on the user computing device and an operating system inside the secure workspace are different types of operating systems.

12. One or more computer storage media storing computer executable instructions which when executed implement a method for taking a snapshot with integrity of a secure workspace having a distributed cache, the method comprising:
notifying, by a host agent executing outside a secure workspace, a workspace agent that is executing inside the secure workspace that a snapshot is to be taken;
causing, by the workspace agent, a filesystem inside the secure workspace to be locked and a cache inside the secure workspace to be flushed;
sending, by the workspace agent, a notification to the host agent, the notification indicating that the cache inside the secure workspace has been flushed;
in response to the cache inside the workspace being flushed, causing, by the host agent, a filesystem outside the secure workspace to be locked and a cache of the user computing device outside the secure workspace to be flushed; and
creating, by the host agent, a snapshot of the secure workspace after the cache inside the secure workspace and the cache of the user computing device outside the secure workspace have been flushed.

13. The computer storage media of claim 12, wherein the method further comprises:

after the snapshot is created, causing the filesystem outside the secure workspace and the filesystem inside the secure workspace to be unlocked.

14. The computer storage media of claim 12, wherein the method further comprises:
sending the snapshot to a management solution for storage in a snapshot repository.

15. The computer storage media of claim 12, wherein the host agent executes inside a supervisory secure workspace.

16. The computer storage media of claim 12, wherein the workspace is a virtual machine.

17. A user computing device comprising:
one or more processors; and
computer storage media storing computer executable instructions which when executed implement a method for taking a snapshot with integrity of a secure workspace having a distributed cache, the method comprising:
receiving, at a host agent executing on the user computing device, a request to take a snapshot of a secure workspace that is deployed on the user computing device, the host agent executing outside the secure workspace;
notifying, by the host agent, a workspace agent that is executing inside the secure workspace that the snapshot is to be taken;
causing, by the workspace agent, a cache inside the secure workspace to be flushed;
sending, by the workspace agent, a notification to the host agent, the notification indicating that the cache inside the secure workspace has been flushed;
in response to the cache inside the workspace being flushed, causing, by the host agent, a cache of the user computing device outside the secure workspace to be flushed; and
creating, by the host agent, a snapshot of the secure workspace after the cache inside the secure workspace and the cache of the user computing device outside the secure workspace have been flushed.

18. The user computing device of claim 17, wherein the method further comprises:
sending the snapshot to a management solution.

19. The user computing device of claim 17, wherein causing the cache inside the secure workspace to be flushed includes locking a filesystem inside the secure workspace, wherein causing the cache of the user computing device outside the secure workspace to be flushed includes locking a filesystem of the user computing device outside the secure-workspace, and wherein the method further comprises:
unlocking the filesystem outside the secure workspace; and
unlocking the filesystem inside the secure workspace.

20. The user computing device of claim 17, wherein the secure workspace is a virtual machine.

* * * * *